United States Patent
Keen

(10) Patent No.: US 10,019,994 B2
(45) Date of Patent: Jul. 10, 2018

(54) SYSTEMS AND METHODS FOR RECOGNIZING TEXTUAL IDENTIFIERS WITHIN A PLURALITY OF WORDS

(71) Applicant: Apple Inc., Cupertino, CA (US)

(72) Inventor: Daniel Keen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 842 days.

(21) Appl. No.: 13/913,173

(22) Filed: Jun. 7, 2013

(65) Prior Publication Data

US 2013/0332162 A1    Dec. 12, 2013

Related U.S. Application Data

(60) Provisional application No. 61/657,723, filed on Jun. 8, 2012.

(51) Int. Cl.
| | |
|---|---|
| *G10L 15/26* | (2006.01) |
| *G06F 17/24* | (2006.01) |
| *G06F 17/30* | (2006.01) |
| *G06F 17/21* | (2006.01) |
| *G06F 17/27* | (2006.01) |

(52) U.S. Cl.
CPC ............ *G10L 15/26* (2013.01); *G06F 17/21* (2013.01); *G06F 17/2775* (2013.01); *G06F 17/30* (2013.01)

(58) Field of Classification Search
None
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Zangerle, et al "Recommending #-Tag in Twitter", in proceedings of the Workshop on Semantic Adaptive Socail Web, 2011.*

(Continued)

*Primary Examiner* — Pierre-Louis Desir
*Assistant Examiner* — Yi-Sheng Wang
(74) *Attorney, Agent, or Firm* — Dentons US LLP

(57) ABSTRACT

Methods and systems for recognizing textual identifiers within a plurality of words are described. A textual representation of a voice input is received from a user. The textual representation includes a plurality of words. A keyword is identified in the textual representation. It is determined whether one or more words adjacent to the keyword correspond to a textual identifier of a collection of textual identifiers. Responsive to a determination that the one or more adjacent words correspond to a textual identifier, the keyword and the one or more adjacent words are replaced with the textual identifier.

30 Claims, 10 Drawing Sheets

(56) References Cited

U.S. PATENT DOCUMENTS

| | | |
|---|---|---|
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |

(56) References Cited

U.S. PATENT DOCUMENTS

| | | |
|---|---|---|
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,094,649 A | 6/2000 | Bowen et al. |
| 6,088,731 A | 7/2000 | Kiraly et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Belllegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |

(56) References Cited

U.S. PATENT DOCUMENTS

| | | |
|---|---|---|
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,936 B2 | 2/2011 | Longé et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |

(56) References Cited

U.S. PATENT DOCUMENTS

| | | | |
|---|---|---|---|
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,195,468 B2 | 6/2012 | Weider et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,380 B1 * | 10/2012 | Kelly ............... G06F 17/30528 703/23 |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 8,989,713 B2 * | 3/2015 | Doulton ............... H04L 12/5835 455/413 |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0164000 A1 | 11/2002 | Cohen et al. |
| 2002/0198714 A1 | 12/2002 | Zhou |
| 2004/0135701 A1 | 7/2004 | Yasuda et al. |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |

(56) References Cited

U.S. PATENT DOCUMENTS

| | | |
|---|---|---|
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0066212 A1* | 3/2012 | Jennings .......... G06F 17/30144 707/723 |
| 2012/0136985 A1 | 5/2012 | Popescu et al. |
| 2012/0137367 A1 | 5/2012 | Dupont et al. |
| 2012/0173464 A1 | 7/2012 | Tur et al. |
| 2012/0197995 A1* | 8/2012 | Caruso .............. G06F 17/3089 709/204 |
| 2012/0201362 A1* | 8/2012 | Crossan ................ G10L 15/26 379/88.01 |
| 2012/0254152 A1* | 10/2012 | Park ...................... G06Q 30/02 707/710 |
| 2012/0265528 A1 | 10/2012 | Gruber et al. |
| 2012/0265806 A1* | 10/2012 | Blanchflower ........ G06Q 10/10 709/204 |
| 2012/0271676 A1 | 10/2012 | Aravamudan et al. |
| 2012/0311583 A1 | 12/2012 | Gruber et al. |
| 2013/0055099 A1* | 2/2013 | Yao ..................... G06Q 10/101 715/739 |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 2000/60435 | 10/2000 |
| WO | WO 2000/60435 A3 | 10/2000 |
| WO | 02/31814 A1 | 4/2002 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Dragon NaturallySpeaking Version 11 Users Guide, Copyright @2002-2010 Nuance Communications, Inc.*

Agnäs, MS., et al., "Spoken Language Translator: First-Year Report," Jan. 1994, SICS (ISSN 0283-3638), SRI and Telia Research AB, 161 pages.

Allen, J., "Natural Language Understanding," 2nd Edition, Copyright © 1995 by The Benjamin/Cummings Publishing Company, Inc., 671 pages.

Alshawi, H., et al., "CLARE: A Contextual Reasoning and Cooperative Response Framework for the Core Language Engine," Dec. 1992, SRI International, Cambridge Computer Science Research Centre, Cambridge, 273 pages.

Alshawi, H., et al., "Declarative Derivation of Database Queries from Meaning Representations," Oct. 1991, Proceedings of the BANKAI Workshop on Intelligent Information Access, 12 pages.

Alshawi H., et al., "Logical Forms in the Core Language Engine," 1989, Proceedings of the 27th Annual Meeting of the Association for Computational Linguistics, 8 pages.

Alshawi, H., et al., "Overview of the Core Language Engine," Sep. 1988, Proceedings of Future Generation Computing Systems, Tokyo, 13 pages.

Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z_1992.

Appelt, D., et al., "Fastus: A Finite-state Processor for Information Extraction from Real-world Text," 1993, Proceedings of IJCAI, 8 pages.

Appelt, D., et al., "SRI: Description of the JV-FASTUS System Used for MUC-5," 1993, SRI International, Artificial Intelligence Center, 19 pages.

Appelt, D., et al., SRI International Fastus System MUC-6 Test Results and Analysis, 1995, SRI International, Menlo Park, California, 12 pages.

Archbold, A., et al., "A Team User's Guide," Dec. 21, 1981, SRI International, 70 pages.

Bear, J., et al., "A System for Labeling Self-Repairs in Speech," Feb. 22, 1993, SRI International, 9 pages.

Bear, J., et al., "Detection and Correction of Repairs in Human-Computer Dialog," May 5, 1992, SRI International, 11 pages.

Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.

Bear, J., et al., "Using Information Extraction to Improve Document Retrieval," 1998, SRI International, Menlo Park, California, 11 pages.

(56) References Cited

OTHER PUBLICATIONS

Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.

Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.

(56) References Cited

OTHER PUBLICATIONS

Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Katz, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "Rextor: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages. Best Copy Available.
Milstead, J., et al., "Metadata: Cataloging by Any Other Name . . . " Jan. 1999, Online, Copyright @ 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.

(56) References Cited

OTHER PUBLICATIONS

Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., et al., "Adapting the Core Language Engine to French and Spanish," May 10, 1996, Cornell University Library, 9 pages. http://arxiv.org/abs/cmp-lg/9605015.
Rayner, M., "Abductive Equivalential Translation and its application to Natural Language Database Interfacing," Sep. 1993 Dissertation paper, SRI International, 163 pages.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.
Rudnicky, A.I., et al., "Creating Natural Dialogs in the Carnegie Mellon Communicator System,".
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.

(56) References Cited

OTHER PUBLICATIONS

Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14,1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.
Bellegarda, J. R., "A Latent Semantic Analysis Framework for Large-Span Language Modeling," 5th European Conference on Speech, Communication and Technology, (Eurospeech'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al, "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I. et al., "Error-Correction Detection and Response Generation in a Spoken Dialogue System," © 2004 Elsevier B.V., specom.2004.09.009, 18 pages.
Bulyko, I., et al., "Joint Prosody Prediction and Unit Selection for Concatenative Speech Synthesis," Electrical Engineering Department, University of Washington, Seattle, 2001, 4 pages.

(56) References Cited

OTHER PUBLICATIONS

Bussler, C., et al., "Web Service Execution Environment (WSMX)," Jun. 3, 2005, W3C Member Submission, http://www.w3.org/Submission/WSMX, 29 pages.
Bussey, H. E., et al., "Service Architecture, Prototype Description, and Network Implications of A Personalized Information Grazing Service," INFOCOM'90, Ninth Annual Joint Conference of the IEEE Computer and Communication Societies, Jun. 3-7 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Cox, R. V., et al., "Speech and Language Processing for Next-Millennium Communications Services," Proceedings of the IEEE, vol. 88, No. 8, Aug. 2000, 24 pages.
Davis, Z., et al., "A Personal Handheld Multi-Modal Shopping Assistant," 2006 IEEE, 9 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/tags/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.

(56) References Cited

OTHER PUBLICATIONS

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993 IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hyspertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Roddy, D., et al., "Communication and Collaboration in a Landscape of B2B eMarketplaces," VerticalNet Solutions, white paper, Jun. 15, 2000, 24 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

(56) References Cited

OTHER PUBLICATIONS

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
SRI2009, "SRI Speech: Products: Software Development Kits: EduSpeak," 2 pages, available at http://web.archive.org/web/20090828084033/http://www.speechatsri.com/products/eduspeak.shtml.
Tenenbaum, A.M., et al., "Data Structure Using Pascal," 1981 Prentice-Hall, Inc., 34 pages.
Tsai, W.H., et al., "Attributed Grammar-A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
Van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat., & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, last modified page date: Oct. 13, 2009, http://en.wikipedia.org/wiki/Mel_scale, 2 pages.
Wikipedia, "Minimum Phase," Wikipedia, the free encyclopedia, last modified page date: Jan. 12, 2010, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 5th ISCA Speech Synthesis Workshop—Pittsburgh, Jun. 14-16, 2004, 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Stron.).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask For," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," May 1999, http://webdocs.cs.ualberta.ca/~ree/publications/papers2/ATS.AA99.pdf, 10 pages.
Ericsson, S. et al., "Software illustrating a unified approach to multimodaiity and multilinguality in the in-home domain," Dec. 22, 2006, Talk and Look: Tools for Amhient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems." Feb. 8, 2012, http://www.evi.com/, 3 pages.

(56) References Cited

OTHER PUBLICATIONS

Feigenbaum, E., et al., "Computer-assisted Semantie Annotation of Scientific Life Works," 2007, http://tomgruber.org/writing/stanford-cs300.pdf, 22 pages.
Gannes, L., "Alfred App Gives Personalized Restaurant Recommendations," allthingsd.com. Jul. 18, 2011, http://allthingsd.com/20110718/alfred-app-gives-personalized restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Gruber, T. R., et al., "An Ontology for Engineering Mathematics," In Jon Doyne, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.
Gruber, T. R., et al., "NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

(56) References Cited

OTHER PUBLICATIONS

Intraspect Software, "The Intraspect Knowledge Management Solution Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitre, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
*Phoenix Solutions, Inc.* v. *West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube, "Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, ©1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).
International Preliminary Report on Patentability received for PCT Patent Application No. PCT/US2013/044834, dated Dec. 9, 2014, 9 pages.
International Search Report and Written Opinion received for PCT Patent Application No. PCT/US2013/044834, dated Dec. 20, 2013, 13 pages.

\* cited by examiner

SYSTEMS AND METHODS FOR RECOGNIZING TEXTUAL IDENTIFIERS WITHIN A PLURALITY OF WORDS

RELATED APPLICATION

This application claims priority to U.S. Provisional Application Ser. No. 61/657,723, filed Jun. 8, 2012, which is incorporated herein by reference in its entirety.

TECHNICAL FIELD

The disclosed embodiments relate generally to digital assistant systems, and more specifically, methods of recognizing textual identifiers in textual representations that are input by a user.

BACKGROUND

Just like human personal assistants, digital assistant systems can perform requested tasks and provide requested advice, information, or services. A digital assistant system's ability to fulfill a user's request is dependent on the digital assistant system's correct comprehension of the request or instructions. Recent advances in natural language processing have enabled users to interact with digital assistant systems using natural language, in spoken or textual forms. Such digital assistant systems can interpret the user's input to deduce the user's intent, translate the deduced intent into actionable tasks and parameters, execute operations or deploy services to perform the tasks, and produce output that is intelligible to the user. The ability of a digital assistant system to produce satisfactory responses to user requests depends on the natural language processing, knowledge base, and artificial intelligence available to the digital assistant system.

Also, users are increasingly using mobile devices to post status updates, messages, or blog posts to online services such as social networks, blogs, and the like. Traditionally, however, speech-to-text systems and/or digital assistants have been confined to information retrieval (e.g., web search), transcribing voice inputs for email or text messages, and the like, and have not been able to handle the special types of text that are sometimes used in postings to social networks, such as FACEBOOK or TWITTER. For example, a user may wish to input via a digital assistant special types of text, such as online handles or usernames (e.g., a TWITTER username), tags (e.g., a TWITTER hashtag), etc., that are difficult for traditional speech-to-text systems and/or digital assistants to identify as anything other than simple text. Accordingly, there is a need for digital assistants to be able to recognize when a user intends to input these special types of text via voice input, and process them appropriately.

SUMMARY

As described above, there is a need for digital assistant systems that are capable of recognizing special types of text, and processing them appropriately. This enables the digital assistant to provide a complete and comprehensive experience in contexts where special types of text are provided via voice input. For example, to enable digital assistants to provide a comprehensive user experience when posting to social networks, it is necessary to be able to recognize when a user is attempting to input a textual identifier (e.g., a TWITTER hashtag or username). This is especially helpful where it would otherwise be ambiguous whether a voice input should be transcribed directly, or converted or modified in some way to account for the user's intention. Specifically, a speech-to-text system will simply transcribe words, without recognizing the intent that they should have any special formatting: the spoken utterance "hashtag favorite band" will be transcribed just as it is spoken, rather than as the intended "#FavoriteBand." The disclosed systems and methods enable digital assistant systems to recognize when a user intends to input a textual identifier via a voice input, and replace it with the appropriate text, symbols, and/or formatting.

Some embodiments provide a method of recognizing textual identifiers within a plurality of words. The method is performed at an electronic device having one or more processors and memory storing one or more programs. The method includes receiving a textual representation of a user's voice input. In some embodiments, the voice input is received from the user. The textual representation including a plurality of words. The method further includes identifying a keyword in the textual representation. The method further includes determining whether one or more words adjacent to the keyword correspond to a textual identifier of a collection of textual identifiers. The method further includes, responsive to a determination that the one or more adjacent words correspond to a textual identifier, replacing the keyword and the one or more adjacent words with the textual identifier. In some embodiments, the method further includes, responsive to a determination that the one or more adjacent words do not correspond to a textual identifier, not replacing the keyword and the one or more adjacent words.

In some embodiments, the adjacent words immediately follow the keyword. In some embodiments, at least one of the one or more adjacent words is composed only of a single letter. In some embodiments, the textual identifier is a concatenation of the one or more adjacent words without interstitial spaces. In some embodiments, the textual identifier is a concatenation of a symbol and the one or more adjacent words without interstitial spaces.

In some embodiments, the textual identifier is a hashtag. In some embodiments, the hashtag is a TWITTER hashtag. In some embodiments, the hashtag includes the symbol "#" followed by one or more words.

In some embodiments, the collection of textual identifiers includes hashtags that were previously identified by a social network. In some embodiments, the collection includes hashtags that meet a predefined popularity metric. In some embodiments, the predefined popularity metric is a frequency of appearance in a social network within a predefined time period.

In some embodiments, the textual identifier is a username. In some embodiments, the username is a TWITTER username. In some embodiments, the username includes the symbol "@" followed by one or more words.

In some embodiments, the collection of textual identifiers includes usernames that are registered in a social network. In some embodiments, the social network is TWITTER.

In some embodiments, the collection of textual identifiers is a contact list of the user. In some embodiments, the collection is a set of usernames previously input by the user. In some embodiments, the textual identifier is an email address.

Some embodiments provide a method of recognizing textual identifiers within a plurality of words. The method is performed at an electronic device having one or more processors and memory storing one or more programs. The method includes receiving a textual representation of a user's voice input, the textual representation including a plurality of words. In some embodiments, the method includes receiving the voice input from the user. The method further includes identifying a first keyword in the textual representation, the first keyword indicating the beginning of a textual tag, and identifying a second keyword in the textual representation, the second keyword indicating the end of a textual tag. The method further includes identifying one or more words between the first keyword and the second keyword. The method further includes replacing the first keyword, the second keyword, and the one or more words therebetween with a textual tag, wherein the textual tag comprises the one or more words.

In some embodiments, the textual tag further comprises a symbol preceding the one or more words. In some embodiments, the symbol is "#." In some embodiments, the first keyword is "hashtag," and the second keyword is "end hashtag." In some embodiments, the textual identifier is a concatenation of the one or more adjacent words without interstitial spaces.

In accordance with some embodiments, a computer-readable storage medium (e.g., a non-transitory computer readable storage medium) is provided, the computer-readable storage medium storing one or more programs for execution by one or more processors of an electronic device, the one or more programs including instructions for performing any of the methods described above.

In accordance with some embodiments, an electronic device is provided that comprises means for performing any of the methods described above.

In accordance with some embodiments, an electronic device is provided that comprises a processing unit configured to perform any of the methods described above.

In accordance with some embodiments, an electronic device is provided that comprises one or more processors and memory storing one or more programs for execution by the one or more processors, the one or more programs including instructions for performing any of the methods described above.

In accordance with some embodiments, an information processing apparatus for use in an electronic device is provided, the information processing apparatus comprising means for performing any of the methods described above.

In accordance with some embodiments, a graphical user interface on a portable electronic device or a computer system with a display, a memory, and one or more processors to execute one or more programs stored in the memory is provided, the graphical user interface comprising user interfaces displayed in accordance with any of the methods described above.

Thus, digital assistant systems are provided with new and improved methods that recognize textual identifiers within a plurality of words. Such methods and systems may complement or replace existing methods and systems.

BRIEF DESCRIPTION OF THE DRAWINGS

Like reference numerals refer to corresponding parts throughout the drawings.

DESCRIPTION OF EMBODIMENTS

Digital Assistant

Figure 1:
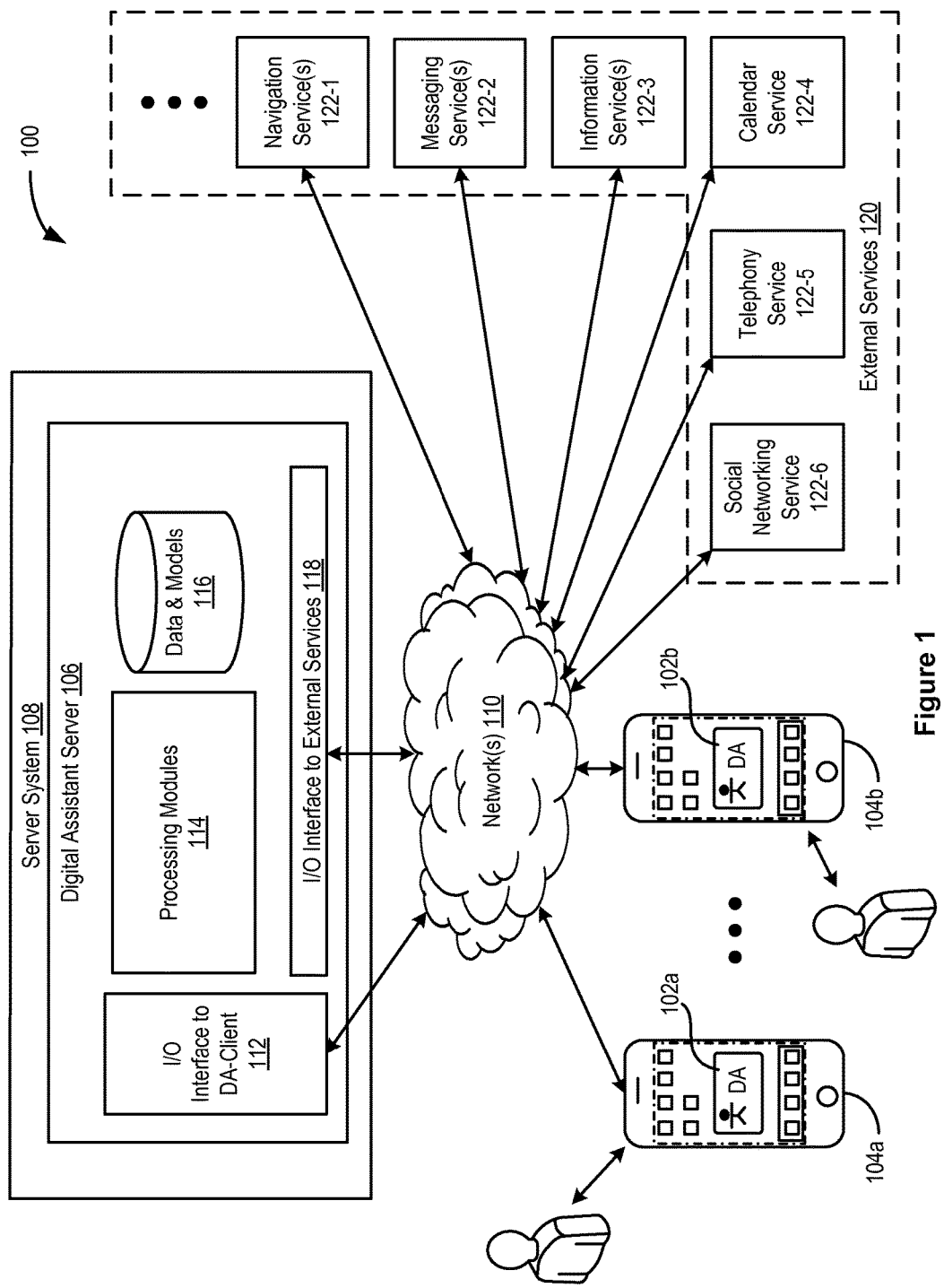
FIG. 1 is a block diagram illustrating an environment in which a digital assistant operates in accordance with some embodiments.

FIG. 1 is a block diagram of an operating environment 100 of a digital assistant according to some embodiments. The terms "digital assistant," "virtual assistant," "intelligent automated assistant," or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, a digital assistant system is capable of accepting a user request at least partially in the form of a natural language command, request, statement, narrative, and/or inquiry. Typically, the user request seeks either an informational answer or performance of a task by the digital assistant system. A satisfactory response to the user request is generally either provision of the requested informational answer, performance of the requested task, or a combination of the two. For example, a user may ask the digital assistant system a question, such as "Where am I right now?" Based on the user's current location, the digital assistant may answer, "You are in Central Park near the west gate." The user may also request the performance of a task, for example, by stating "Please invite my friends to my girlfriend's birthday party next week." In response, the digital assistant may acknowledge the request by generating a voice output, "Yes, right away," and then sending a suitable calendar invite from the user's email address to each of the user' friends listed in the user's electronic address book or contact list. There are numerous other ways of interacting with a digital assistant to request information or performance of various tasks. In addition to providing verbal responses and taking programmed actions, the digital assistant can also provide responses in other visual or audio forms (e.g., as text, alerts, music, videos, animations, etc.).

As shown in FIG. 1, in some embodiments, a digital assistant system is implemented according to a client-server model. The digital assistant system includes a client-side portion (e.g., 102a and 102b) (hereafter "digital assistant (DA) client 102") executed on a user device (e.g., 104a and 104b), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device).

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on the deduced user intent.

In some embodiments, the DA server 106 communicates with external services 120 (e.g., navigation service(s) 122-1, messaging service(s) 122-2, information service(s) 122-3, calendar service 122-4, telephony service 122-5, social networking service 122-6, etc.) through the network(s) 110 for task completion or information acquisition. In some embodiments, the I/O interface to the external services 118 facilitates such communications. In some embodiments, the DA client 102 communicate with external services 120 through the network(s) 110 for task completion or information acquisition.

Examples of the user device 104 include, but are not limited to, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks ("LAN") and wide area networks ("WAN"), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client-side portion (e.g., the DA client 102) and a server-side portion (e.g., the DA server 106), in some embodiments, a digital assistant system refers only to the server-side portion (e.g., the DA server 106). In some embodiments, the functions of a digital assistant can be implemented as a standalone application installed on a user device. In addition, the divisions of functionalities between the client and server portions of the digital assistant can vary in different embodiments. For example, in some embodiments, the DA client 102 is a thin-client that provides only user-facing input and output processing functions, and delegates all other functionalities of the digital assistant to the DA server 106. In some other embodiments, the DA client 102 is configured to perform or assist one or more functions of the DA server 106.

Figure 2:
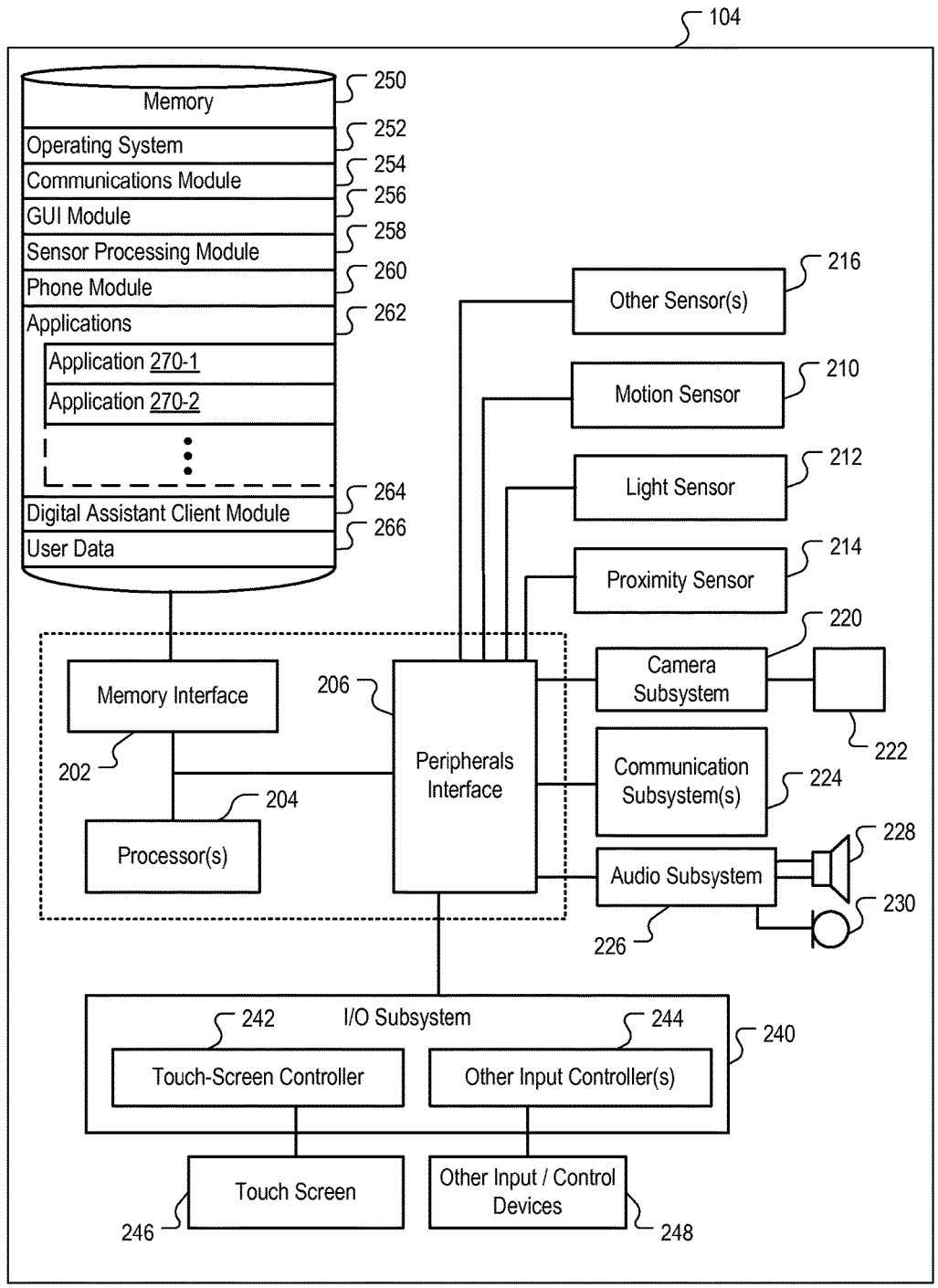
FIG. 2 is a block diagram illustrating a digital assistant client system in accordance with some embodiments.

FIG. 2 is a block diagram of a user device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, in some embodiments, a motion sensor 210, a light sensor 212, and a proximity sensor 214 are coupled to the peripherals interface 206 to facilitate orientation, light, and proximity sensing functions. In some embodiments, other sensors 216, such as a positioning system (e.g., GPS receiver), a temperature sensor, a biometric sensor, and the like, are connected to the peripherals interface 206, to facilitate related functionalities.

In some embodiments, the user device 104 includes a camera subsystem 220 coupled to the peripherals interface 206. In some embodiments, an optical sensor 222 of the camera subsystem 220 facilitates camera functions, such as taking photographs and recording video clips. In some embodiments, the user device 104 includes one or more wired and/or wireless communication subsystems 224 to provide communication functions. The communication subsystems 224 typically include various communication ports, radio frequency receivers and transmitters, and/or optical (e.g., infrared) receivers and transmitters. In some embodiments, the user device 104 includes an audio subsystem 226 coupled to one or more speakers 228 and one or more microphones 230 to facilitate voice-enabled functions, such as voice recognition, voice transcription, voice replication, digital recording, and telephony functions.

In some embodiments, an I/O subsystem 240 is also coupled to the peripherals interface 206. In some embodiments, the user device 104 includes a touch screen 246, and the I/O subsystem 240 includes a touch screen controller 242 coupled to the touch screen 246. When the user device 104 includes the touch screen 246 and the touch screen controller 242, the touch screen 246 and the touch screen controller 242 are typically configured to, for example, detect contact and movement or break thereof using any of a plurality of touch sensitivity technologies, such as capacitive, resistive, infrared, surface acoustic wave technologies, proximity sensor arrays, and the like. In some embodiments, the user device 104 includes a display that does not include a touch-sensitive surface. In some embodiments, the user device 104 includes a separate touch-sensitive surface. In some embodiments, the user device 104 includes other input controller(s) 244. When the user device 104 includes the other input controller(s) 244, the other input controller(s) 244 are typically coupled to other input/control devices 248, such as one or more buttons, rocker switches, thumb-wheels, infrared ports, USB ports, and/or pointer devices (such as a stylus).

The memory interface 202 is coupled to memory 250. In some embodiments, the memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some embodiments, the memory 250 stores an operating system 252, a communications module 254, a graphical user interface ("GUI") module 256, a sensor processing module 258, a phone module 260, and applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The phone module 260 facilitates phone-related processes and functions. The application module 262 facilitates various functionalities of user applications, such as electronic-messaging, web browsing, media processing, navigation, imaging and/or other processes and functions. In some embodiments, the user device 104 stores in the memory 250 one or more software applications 270-1 and 270-2 each associated with at least one of the external service providers.

As described above, in some embodiments, the memory 250 also stores client-side digital assistant instructions (e.g., in a digital assistant client module 264) and various user data 266 (e.g., user-specific vocabulary data, preference data, and/or other data such as the user's electronic address book or contact list, to-do lists, shopping lists, etc.) to provide the client-side functionalities of the digital assistant.

In various embodiments, the digital assistant client module 264 is capable of accepting voice input, text input, touch input, and/or gestural input through various user interfaces (e.g., the I/O subsystem 240) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some embodiments, the digital assistant client module 264 utilizes various sensors, subsystems and peripheral devices to gather additional information from the surrounding environment of the user device 104 to establish a context associated with a user input. In some embodiments, the digital assistant client module 264 provides the context information or a subset thereof with the user input to the digital assistant server (e.g., the digital assistant server 106, FIG. 1) to help deduce the user's intent.

In some embodiments, the context information that can accompany the user input includes sensor information, e.g., lighting, ambient noise, ambient temperature, images or videos of the surrounding environment, etc. In some embodiments, the context information also includes the physical state of the device, e.g., device orientation, device location, device temperature, power level, speed, acceleration, motion patterns, cellular signal strength, etc. In some embodiments, information related to the software state of the user device 104, e.g., running processes, installed programs, past and present network activities, background services, error logs, resource usage, etc., of the user device 104 is also provided to the digital assistant server (e.g., the digital assistant server 106, FIG. 1) as context information associated with a user input.

In some embodiments, the DA client module 264 selectively provides information (e.g., at least a portion of the user data 266) stored on the user device 104 in response to requests from the digital assistant server. In some embodiments, the digital assistant client module 264 also elicits additional input from the user via a natural language dialogue or other user interfaces upon request by the digital assistant server 106 (FIG. 1). The digital assistant client module 264 passes the additional input to the digital assistant server 106 to help the digital assistant server 106 in intent deduction and/or fulfillment of the user's intent expressed in the user request.

In some embodiments, the memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
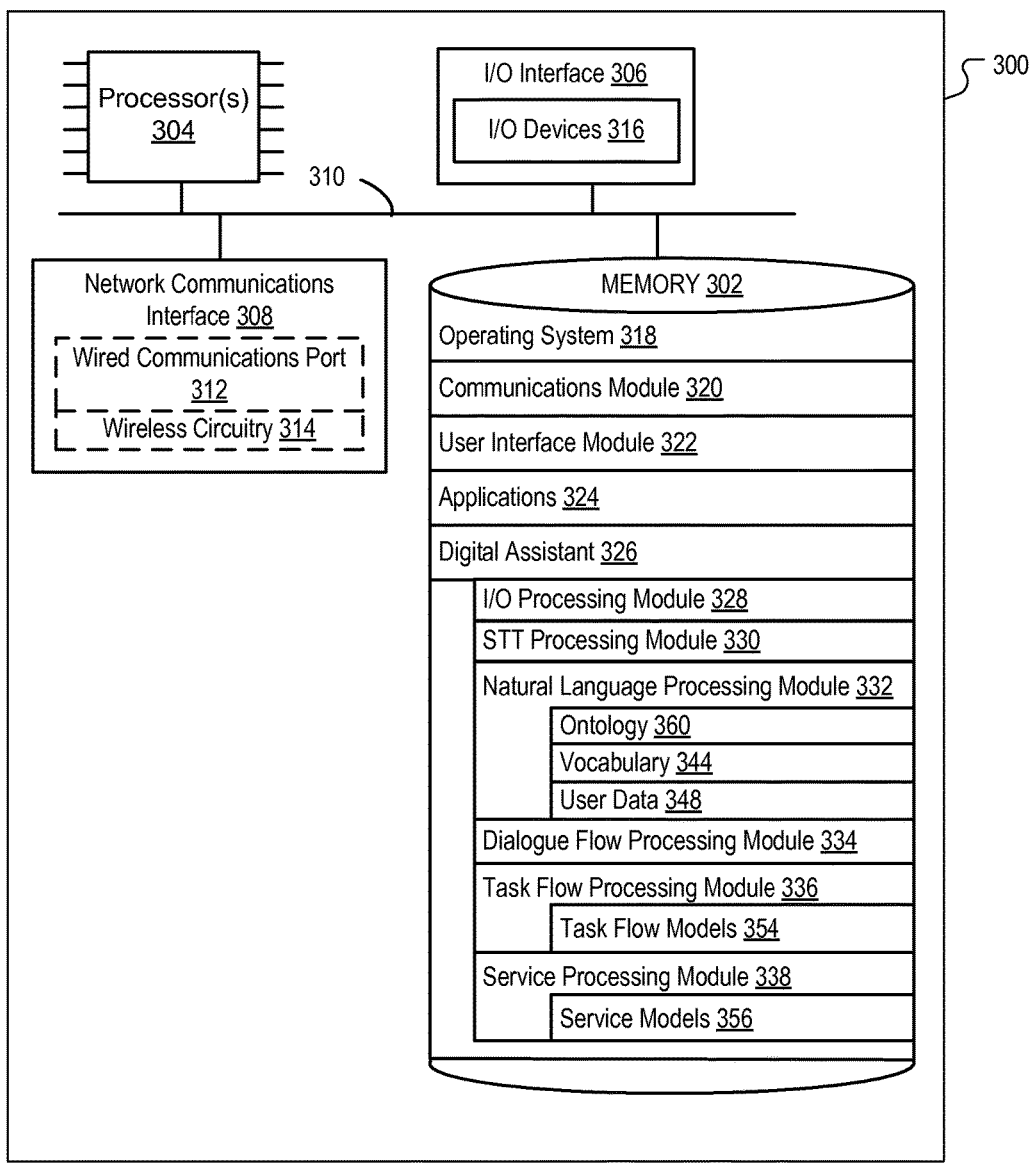
FIG. 3A is a block diagram illustrating a standalone digital assistant system or a digital assistant server system in accordance with some embodiments.

FIG. 3A is a block diagram of an exemplary digital assistant system 300 in accordance with some embodiments. In some embodiments, the digital assistant system 300 is implemented on a standalone computer system. In some embodiments, the digital assistant system 300 is distributed across multiple computers. In some embodiments, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some embodiments, the digital assistant system 300 is an embodiment of the server system 108 (and/or the digital assistant server 106) shown in FIG. 1. In some embodiments, the digital assistant system 300 is implemented in a user device (e.g., the user device 104, FIG. 1), thereby eliminating the need for a client-server system. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some embodiments, the memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some embodiments, when the digital assistant is implemented on a standalone user device, the digital assistant system 300 includes any of the components and I/O and communication interfaces described with respect to the user device 104 in FIG. 2 (e.g., one or more microphones 230). In some embodiments, the digital assistant system 300 represents the server portion of a digital assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some embodiments, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

The memory 302 also stores the digital assistant module (or the server portion of a digital assistant) 326. In some embodiments, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, and a service processing module 338. Each of these processing modules has access to one or more of the following data and models of the digital assistant 326, or a subset or superset thereof: ontology 360, vocabulary index 344, user data 348, task flow models 354, and service models 356.

In some embodiments, using the processing modules (e.g., the input/output processing module 328, the STT processing module 330, the natural language processing module 332, the dialogue flow processing module 334, the task flow processing module 336, and/or the service processing module 338), data, and models implemented in the digital assistant module 326, the digital assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some embodiments, the digital assistant also takes appropriate actions when a satisfactory response was not or could not be provided to the user for various reasons.

Figure 3B:
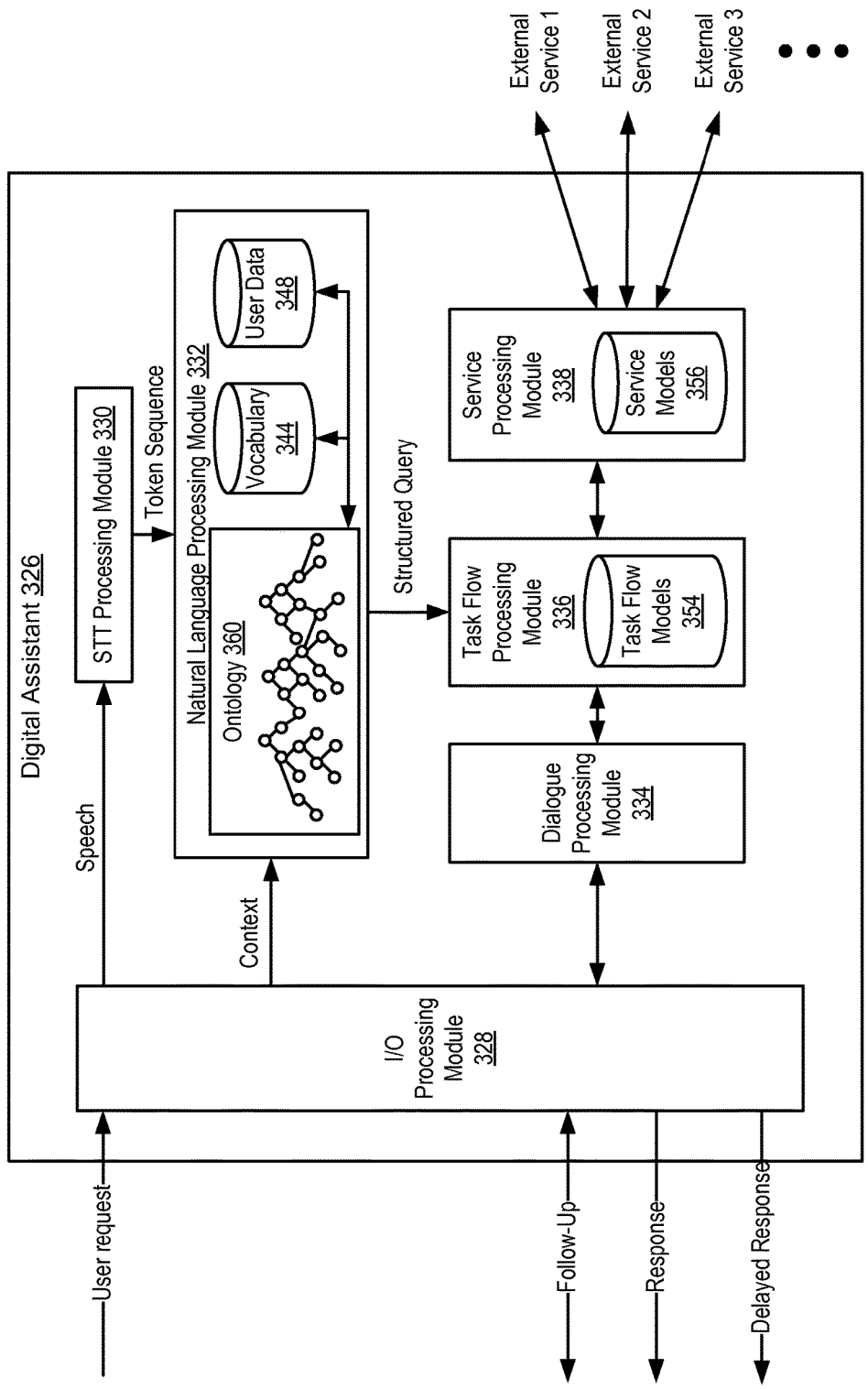
FIG. 3B is a block diagram illustrating functions of the digital assistant shown in FIG. 3A in accordance with some embodiments.

As shown in FIG. 3B, in some embodiments, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. In some embodiments, when a user request is received by the I/O processing module 328 and the user request contains a speech input, the I/O processing module 328 forwards the speech input to the speech-to-text (STT) processing module 330 for speech-to-text conversions.

In some embodiments, the speech-to-text processing module 330 receives speech input (e.g., a user utterance captured in a voice recording) through the I/O processing module 328. In some embodiments, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some embodiments, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, the ontology 360 shown in FIG. 3C includes a "restaurant reservation" node, which is an actionable intent node. Property nodes "restaurant," "date/time" (for the reservation), and "party size" are each directly linked to the "restaurant reservation" node (i.e., the actionable intent node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, the ontology 360 shown in FIG. 3C also includes a "set reminder" node, which is another actionable intent node. Property nodes "date/time" (for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362, a reminder domain 364, and a social network domain 366 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." The social network domain 366 includes the actionable intent node "post to a social network," and property nodes "social network ID" and "message body." In some embodiments, the ontology 360 is made up of many domains. Each domain may share one or more property nodes with one or more other domains. For example, the "date/time" property node may be associated with many other domains (e.g., a scheduling domain, a travel reservation domain, a movie ticket domain, etc.), in addition to the restaurant reservation domain 362 and the reminder domain 364.

Figure 3C:
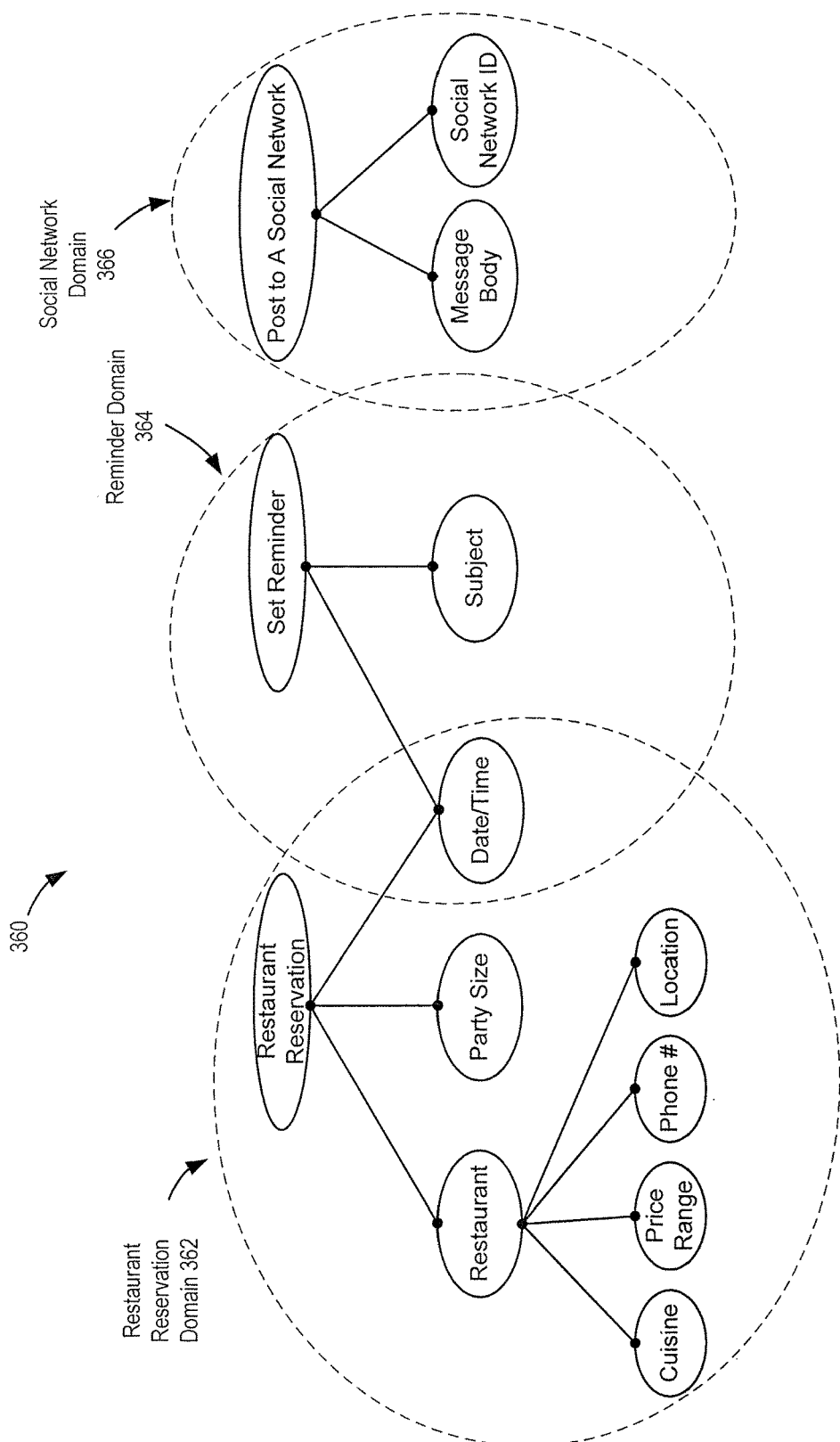
FIG. 3C is a network diagram illustrating a portion of an ontology in accordance with some embodiments.

While FIG. 3C illustrates three exemplary domains within the ontology 360, the ontology 360 may include other domains (or actionable intents), such as "initiate a phone call," "find directions," "schedule a meeting," "send a message," "provide an answer to a question," and so on. For example, a "send a message" domain is associated with a "send a message" actionable intent node, and may further include property nodes such as "recipient(s)," "message type," and "message body." The property node "recipient" may be further defined, for example, by the sub-property nodes such as "recipient name" and "message address."

In some embodiments, the ontology 360 includes all of the domains (and hence actionable intents) that the digital assistant is capable of understanding and acting upon. In some embodiments, the ontology 360 may be modified, such as by adding or removing domains or nodes, or by modifying relationships between the nodes within the ontology 360.

In some embodiments, nodes associated with multiple related actionable intents may be clustered under a "super domain" in the ontology 360. For example, a "travel" super-domain may include a cluster of property nodes and actionable intent nodes related to travel. The actionable intent nodes related to travel may include "airline reservation," "hotel reservation," "car rental," "get directions," "find points of interest," and so on. The actionable intent nodes under the same super domain (e.g., the "travel" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some embodiments, the natural language processor 332 shown in FIG. 3B receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the digital assistant system 300 has previously correctly interpreted a similar request from a user.

In some embodiments, the digital assistant system 300 also stores names of specific entities in the vocabulary index 344, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the digital assistant system 300 can search and identify specific entity names from other data sources, such as the user's address book or contact list, a movies database, a musicians database, and/or a restaurant database. In some embodiments, when the natural language processor 332 identifies that a word in the token sequence is a name of a specific entity (such as a name in the user's address book or contact list), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

Once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some embodiments, the natural language processor 332 populates some parameters of the structured query with received context information. For example, if the user requested a sushi restaurant "near me," the natural language processor 332 may populate a {location} parameter in the structured query with GPS coordinates from the user device 104.

In some embodiments, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some embodiments, the various procedures necessary to complete these tasks are provided in task flow models 354. In some embodiments, the task flow models 354 include procedures for obtaining additional information from the user, and task flows for performing actions associated with the actionable intent.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some embodiments, the dialogue processing module 334 determines how (and/or when) to ask the user for the additional information, and receives and processes the user responses. In some embodiments, the questions are provided to and answers are received from the users through the I/O processing module 328. For example, the dialogue processing module 334 presents dialogue output to the user via audio and/or visual output, and receives input from the user via spoken or physical (e.g., touch gesture) responses. Continuing with the example above, when the task flow processor 336 invokes the dialogue processor 334 to determine the "party size" and "date" information for the structured query associated with the domain "restaurant reservation," the dialogue processor 334 generates questions such as "For how many people?" and "On which day?" to pass to the user. Once answers are received from the user, the dialogue processing module 334 populates the structured query with the missing information, or passes the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue processor 334 disambiguate this property of the structured query. In turn, the dialogue processor 334 may ask the user "Which Bob?", and display (or read) a list of contacts named "Bob" from which the user may choose.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website or service, a banking portal, etc.). In some embodiments, the protocols and application programming interfaces (API) required by each service can be specified by a respective service model among the service models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameters to the online reservation service. When requested by the task flow processor 336, the service processor 338 can establish a network connection with the online reservation service using the web address stored in the service models 356, and send the necessary parameters of the reservation (e.g., time, date, party size) to the online reservation interface in a format according to the API of the online reservation service.

For another example, a social networking service can submit a service model specifying the necessary parameters for posting a message to the service and the APIs for communicating the values of the necessary parameters to the social networking service. When requested by the task flow processor 336, the service processor 338 can establish a network connection with the social networking service using a web address stored in the service models 356, and send the necessary parameters of the message (e.g., account username, credentials, message content) to the social networking service in a format according to the established API.

In some embodiments, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

Automatic Identification of Textual Identifiers

As noted above, digital assistants are sometimes used to quickly and easily create textual messages to be sent to a recipient (e.g., via text message, email, etc.), or posted to an information service (e.g., a social network, a blog, a website, etc.). For example, a user may tell a digital assistant to "Send Bob a text message saying I'm on my way," causing the digital assistant to send a text message (e.g., via short message service, or "SMS") with the content "I'm on my way." The user's utterance is, for example, transcribed by the speech-to-text processing module 330 of a digital assistant system 300. Once transcribed, the digital assistant uses the converted text to determine the user's intent (to send a text message) and the intended content of the message ("I'm on my way").

Increasingly, users are also using mobile devices to post status updates, messages, or blog posts to external services such as social networks, blogs, and the like. Many social networks provide mobile-device applications (e.g., included in applications 262) from which a user can input a message to be posted, broadcast, or otherwise made available to other users. For example, a FACEBOOK application may allow a user to post status updates to his FACEBOOK account. Likewise, a TWITTER application may allow a user to compose and post short text messages, or "tweets," which are then posted to or made available to other TWITTER users.

However, text input mechanisms for portable electronic devices, such as smart phones, tend to be very small, and inputting text can be cumbersome and time consuming. Accordingly, it would be advantageous to leverage the capabilities of a digital assistant, including its speech-to-text capabilities, to help simplify text input for messages and social network postings. Moreover, because the digital assistant can interact with external services, such as a social networking service 122-6, the digital assistant can post a user's text directly to that external service without requiring the user to open a separate application associated with that service (e.g., a dedicated FACEBOOK or TWITTER application). In some embodiments, a digital assistant is permitted to post to a particular service if there is an application associated with that service installed on the same device as the digital assistant, or otherwise associated with a user of the digital assistant.

While a typical speech-to-text system may simplify text input on mobile devices, it will not allow a user to take advantage of all of the functionality provided by certain services or social networks. Specifically, some social networks allow special textual identifiers to differentiate and/or signify certain types of information within their postings. For example, a social networking service may use special characters to signify portions of the text that correspond to usernames or tags within a posting. The social network may use these characters to facilitate indexing, searching, and/or analyzing postings, and/or to differentiate (graphically or otherwise) the usernames or tags from the surrounding text.

One social networking service that uses special textual identifiers to signify certain types of information is TWITTER, where users compose short messages (e.g., containing 144 characters or less), and post those messages to their accounts. These messages, or "tweets," are then available to other users within the social network. In many cases, a user's tweets are sent to the accounts of anyone who has chosen to "follow" the user, rather than to a specified addressee (as in the case of email or text messages).

Two examples of special textual identifiers recognized in TWITTER messages are the username and the hashtag. TWITTER usernames uniquely identify members of the social network, and are preceded by the "@" symbol. For example, a user may be associated with a username "@user1234." (The "@" symbol is typically verbalized as the word "at," so this username may be spoken as "at user 1234.") Usernames are often included in the text of a tweet, for example, when a user is responding to or referring to another user. Usernames can then be used to organize messages for searching, categorization, and the like, such as when someone wishes to search for tweets posted by a particular user, or that mention a particular user.

Hashtags are any combination of words, letters, numbers, and/or symbols that follow a "#" symbol (without interstitial spaces). As discussed below, hashtags can be used to organize messages for searching, categorization, and the like. In many cases, hashtags are contextually relevant to the tweet in which they are included. For example, a user may compose a tweet saying "I like Mint Chocolate Chip! #FavoriteIceCream." In this case, the hashtag "#FavoriteIceCream" is relevant to the content of the tweet. Often, hashtags become social trends, and numerous users will post tweets with the same hashtag in order to participate in the trend. For example, another user may read the above tweet regarding his friend's preference for mint chocolate chip ice cream, and post a message with his preference: "Call me boring, but I love vanilla! #FavoriteIceCream."

As noted above, usernames and hashtags can be used to facilitate indexing, searching, and analyzing messages posted to a social network, such as TWITTER. For example, a TWITTER user can easily search for tweets that mention a particular person by entering that person's TWITTER username into a search field. Because usernames are preceded by the "@" symbol, searching for tweets based on usernames can be performed faster and more efficiently than by full text searching. Similarly, a user can search for tweets that refer to a particular subject matter by searching for an associated hashtag. Continuing the example from above, a user may search for all tweets with the hashtag "#FavoriteIceCream" in order to find other tweets containing (and presumably related to) that hashtag.

Typical speech-to-text systems are not suitable, however, for composing messages that include properly formatted TWITTER usernames and hashtags. For example, typical speech-to-text systems attempt to place spaces between each successive word uttered by a user, which makes it difficult to input a hashtag or username that is composed of more than one word strung together without spaces. Thus, if a user intended to input the hashtag "#FavoriteIceCream" using a typical speech-to-text system, the user's utterance would be transcribed as separate words, resulting in the text "hashtag favorite ice cream," which fails to capture the user's intent. Indeed, a typical speech-to-text system will not recognize that "hashtag" indicates the beginning of a special textual identifier, nor will it identify that one or more of the uttered words should be concatenated into one continuous string of characters. This problem is exacerbated by the fact that any user may create new hashtags at any time: there is no rule by which the typical speech-to-text system could identify which words following the word "hashtag" (or some other suitable keyword) should be concatenated. This is especially true because hashtags need not be placed at the end of a message—they may be placed at the beginning or in the middle of a message. For example, a user may intend to compose a message saying "Trying my #FavoriteIceCream at the ice cream stand. Rocky Road!" Typical speech-to-text transcriptions may transcribe the utterance as "hashtag favorite ice cream at the ice cream stand . . . " or "#favorite ice cream at the ice cream stand . . . ," neither of which captures the user's intent. Usernames present similar problems, because they may be composed of multiple words, letters, numbers, etc. For example, a username "@HannahBee2" would be difficult to correctly transcribe using traditional speech-to-text systems.

Accordingly, it would be beneficial to provide a digital assistant that can correctly transcribe usernames and hashtags (and/or other special textual identifiers) for inclusion into messages, tweets, emails, and the like. In some embodiments, a digital assistant (e.g., digital assistant system 300) is configured to recognize that certain parts of a transcribed speech input correspond to a special textual identifier such as a username or a hashtag. In some embodiments, the digital assistant is configured to recognize one or more keywords indicating that one or more words, letters, numbers, and/or symbols following or preceding the keyword should be replaced with a properly formatted username or hashtag. In some embodiments, the digital assistant determines whether one or more of the words, letters, etc., following or preceding a keyword correspond to a known hashtag or username. The following discussion provides details of a digital assistant that can recognize special textual identifiers as described.

Figure 4A:
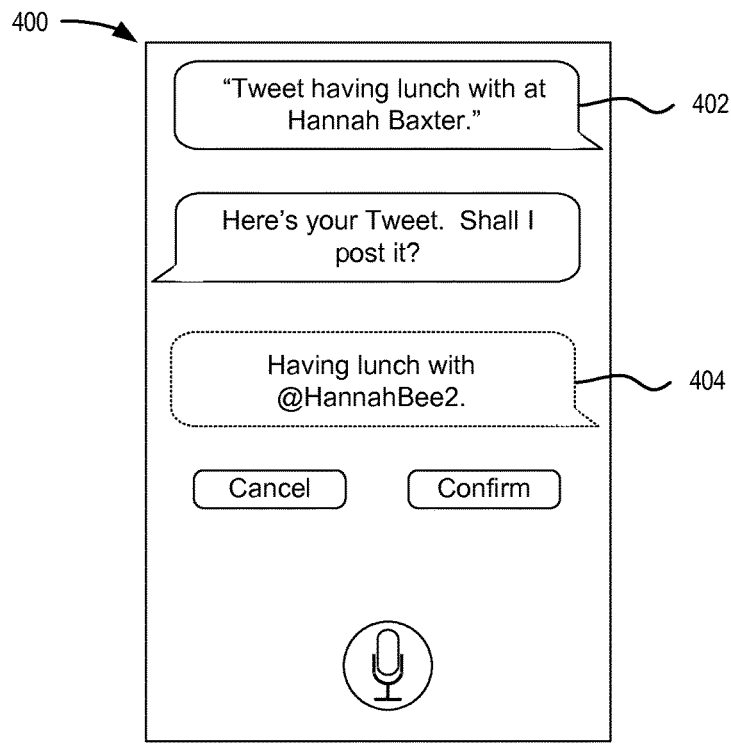
FIGS. 4A-5C are block diagrams illustrating example user interfaces depicting portions of dialogue between a digital assistant and a user in accordance with some embodiments.

FIG. 4A illustrates an example of a user interface 400 showing a possible dialogue between a user and a digital assistant in accordance with some embodiments. In this example, the digital assistant module 326 (e.g., using the speech to text processing module 330) transcribed an utterance from a user including the words "Tweet having lunch with at Hannah Baxter." The digital assistant 326 uses natural language processing (e.g., with the natural language processing module 332) to determine that the user is requesting the digital assistant to post a message to the user's TWITTER feed.

In some embodiments, the digital assistant displays this transcription to the user in bubble 402. In this example, the words "at Hannah Baxter" suggest that the user intended to include Hannah Baxter's username in the tweet. However, the username is not properly reflected in the transcription. Thus, the digital assistant identifies that "at Hannah Baxter" should be replaced with a username associated with Hannah Baxter.

In some embodiments, in order to identify and replace text with an intended username, the digital assistant 326 recognizes a particular word in the transcribed utterance as a keyword indicating that one or more of the following words (or nearby words) refer to a particular person who is associated with a username. In this example, the digital assistant 326 recognizes the word "at" as the keyword, though other keywords may also be used. In some cases, a user will simply recite a person's name (e.g., "Hannah Baxter"), and the digital assistant will determine the appropriate username to include (e.g., "@HannahBee2"). In other cases, a user will recite an actual username (e.g., by saying "at Hannah Be Two").

Returning to FIG. 4A, the digital assistant identifies the appropriate username, and replaces the transcription "at Hannah Baxter" with the username "@HannahBee2". In some embodiments, the digital assistant identifies usernames included in a tweet by searching a contact list associated with the user of the digital assistant. In the present example, the digital assistant may search a contact list on a user device 104 in order to determine the appropriate username of a person named Hannah Baxter. In some embodiments, the digital assistant 326 identifies usernames by searching a list of usernames within a social network, such as all usernames within the social network, or usernames of people that are specifically associated with the user (e.g., usernames of the user's followers, usernames of people that the user is following, etc.). Once the username is identified, the digital assistant 326 may present the tweet, including the properly formatted username, in the preview bubble 404. In some embodiments, the preview bubble 404 is displayed without also displaying the bubble 402 with the first transcribed input.

Figure 4B:
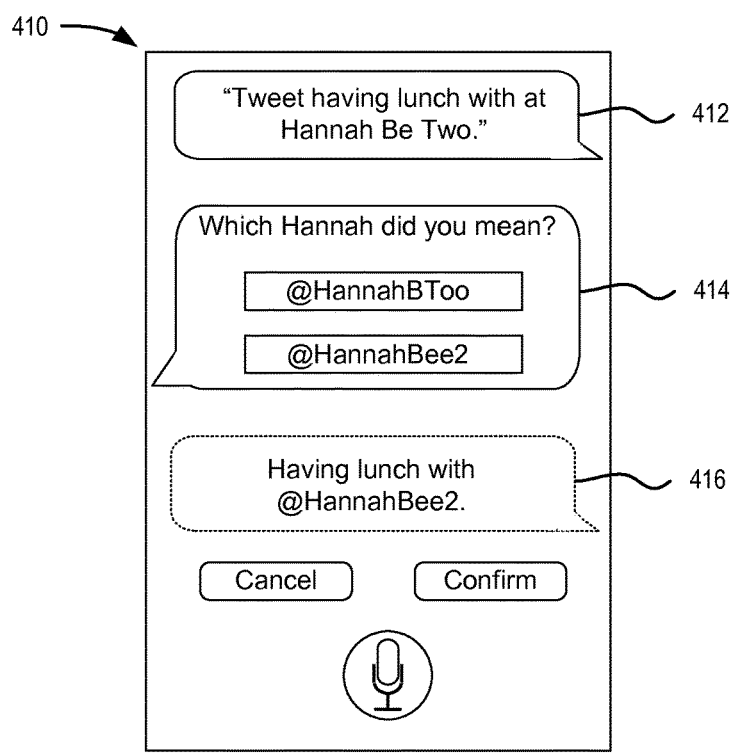

As noted above, a user may dictate an actual username, rather than simply referring to the proper name of a particular user. FIG. 4B illustrates an example of another user interface 410 showing a possible dialogue between a user and a digital assistant in accordance with some embodiments. In this example, the user dictated a verbal representation of the username associated with Hannah Baxter. Bubble 412 displays a transcription of the user's utterance: "Tweet having lunch with at Hannah Be Two." The digital assistant 326 can recognize that one or more words following "at" might represent a username, and search for possible usernames with which to replace the transcribed text. For example, the digital assistant may search a contact list on the user device 104 (or a group of usernames registered within the social network) for users that have a username corresponding to "@Hannah," "@HannahB," "@HannahBee," "@HannahB2," etc. If the digital assistant identifies a username that is an appropriate match, the transcribed text can be replaced with the identified username. If the digital assistant identifies more than one possible match (e.g., "@HannahBToo" and "@HannahBee2"), the digital assistant may engage in a dialogue with the user to disambiguate the input. The bubble 414 illustrates a possible disambiguation dialogue, where the digital assistant 326 asks the user to specify which username was intended. The user may select the intended username, via voice or touch input, for example. The selected username is then included in the preview bubble 416 for the user to review. In some embodiments, if no username can be identified, the digital assistant will not replace the transcribed words with a username, and will simply use the transcribed words as identified by the speech-to-text processing module 330 and/or the natural language processing module 332.

In some embodiments, a digital assistant 326 does not rely on keywords in order to automatically identify and replace input text with usernames or other textual identifiers. For example, a user may provide an utterance that includes a name of a person without any keywords, such as "Tweet having lunch with Hannah Baxter." In some embodiments, the digital assistant will search the input text for words that correspond to names in the user's contact list, or names of people that are associated with any of the user's social networks. If a name is found in the input text, the digital assistant may replace the name with the appropriate username (e.g., a TWITTER username). In some embodiments, the digital assistant will prompt the user to confirm whether an identified username should be used in place of the plain-text name.

Another example of a textual identifier that a digital assistant 326 can recognize in a spoken utterance is a hashtag. As described above with reference to usernames, in some embodiments, the digital assistant is configured to replace one or more words following a certain keyword with a properly formatted hashtag. A properly formatted hashtag may comprise a string of words, letters, numbers, and/or symbols that follow a "#" symbol (without interstitial spaces).

Figure 5A:
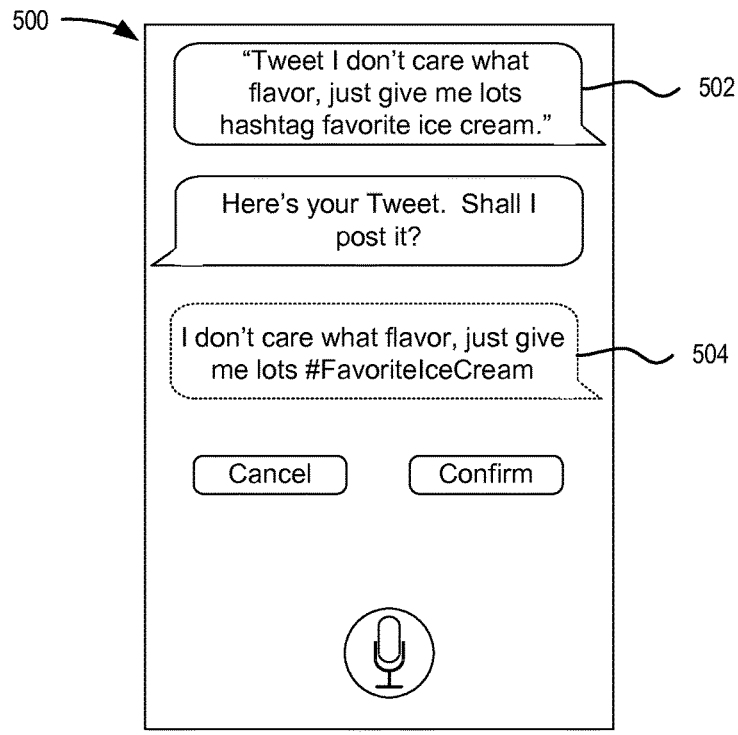

FIG. 5A illustrates an example of a user interface 500 showing a possible dialogue between a user and a digital assistant in accordance with some embodiments. In this example, the digital assistant 326 (e.g., using the speech to text processing module 330) transcribed an utterance from a user including the words "Tweet I don't care what flavor, just give me lots hashtag favorite ice cream." In some embodiments, the digital assistant 326 provides this transcription in the bubble 502. FIG. 5A illustrates an example where the term "hashtag" acts as a keyword to indicate that one or more of the following (or nearby) words should be replaced with a properly formatted hashtag. Other keywords could be used instead or in addition to "hashtag," including, for example, "hash," "tag," "pound," "mark," etc. Upon detection of the keyword, the digital assistant 326 will attempt to replace one or more of the words following (or preceding) the keyword with a properly formatted hashtag. In some embodiments, the digital assistant creates a properly formatted hashtag by concatenating all (or at least some) of the words following the keyword, and adding the proper symbol to the beginning of the concatenated text. As shown in the preview bubble 504, the digital assistant 326 has replaced the text "hashtag favorite ice cream" with "#FavoriteIceCream."

Figure 5B:
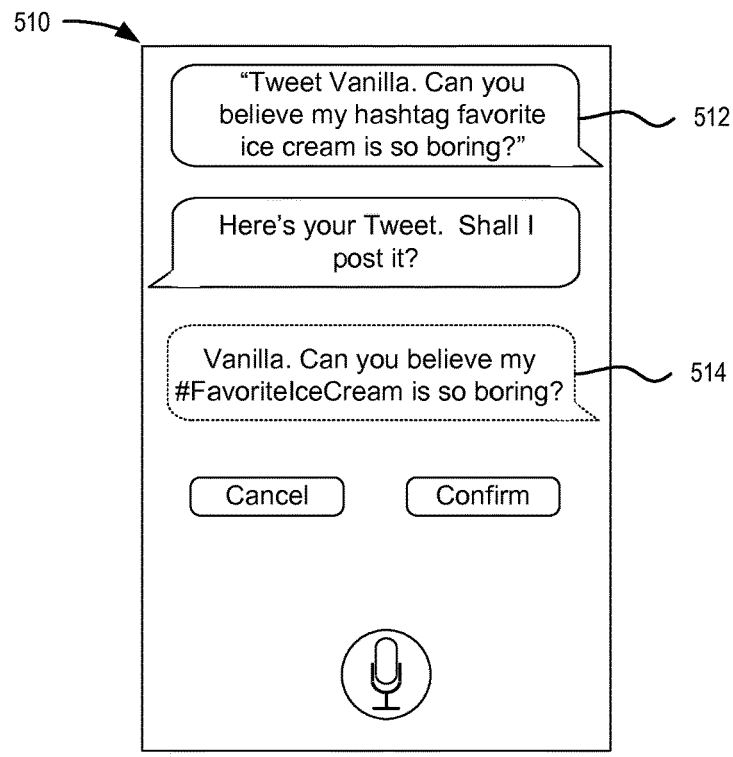

However, it is not always the case that every word following a keyword is intended to be part of the hashtag. For example, a hashtag comprising multiple concatenated words may be placed at the beginning or middle of a message, making it difficult to determine which words should be converted to a hashtag, and which should not. FIG. 5B illustrates an example of a user interface 510 showing a possible dialogue between a user and a digital assistant where the user placed a hashtag in between other textual portions of a message, in accordance with some embodiments. In this example, the digital assistant (e.g., using the speech to text processing module 330) transcribed an utterance from a user including the words "Tweet Vanilla. Can you believe my hashtag favorite ice cream is so boring?" In some embodiments, the digital assistant 326 provides this transcription in the bubble 512. Once again, the digital assistant 326 recognizes that the word "hashtag" indicates the possibility that the user intends one or more of the following words to be replaced with a properly formatted hashtag. In this case, however, it is not clear what those words may be. For example, it not clear whether the user intended the message to include "#Favorite," "#FavoriteIceCream," or "#FavoriteIceCreamIsSoBoring." The problem is exacerbated by the fact that hashtags need not follow any particular grammar, or even be composed of complete words (e.g., #AMA, #M5, #CNN, etc.).

In some embodiments, in order to correctly identify text that is intended to correspond to a hashtag, the digital assistant 326 determines whether the user's input corresponds to any of a set of known hashtags. Because hashtags often represent a popular social themes, ideas, sentiments, etc., people will include a hashtag in a message after seeing it in other people's messages, or after seeing it in a list of popular hashtags. Thus, in some embodiments, the digital assistant 326 (in some embodiments, in combination with social networking service 122-6) searches among a set of currently popular hashtags for any that match one or more of the words following the keyword. In another example, the digital assistant 326 may search among a set of hashtags that are found in messages (e.g., tweets) that the user has recently read, or which are posted to the user's account. The digital assistant 326 then attempts to identify popular hashtags that may match the words input by the user. In FIG. 5B, the candidate words that may comprise the hashtag are those that follow the keyword: "favorite ice cream is so boring." In some embodiments, the digital assistant 326 will search for various potential concatenations of these words (e.g., "#Favorite," "#FavoriteIce," "#FavoriteIceCream," etc.) to determine a best candidate hashtag. If one of the hashtags matches (or is similar to), for example, a popular hashtag or a recently read hashtag, that particular combination of words and/or characters is converted into a properly formatted hashtag for inclusion into the user's message. In some embodiments, matching algorithms also account for possible transcription errors in searching for candidate hashtags. For example, if a user's utterance was incorrectly transcribed as "hashtag favorite eyes cream," the digital assistant 326 can determine, using an appropriate algorithm (e.g., by searching previously used hashtags), that this is similar to "#FavoriteIceCream," and replace the transcribed text accordingly.

In some embodiments, the digital assistant requests additional input from a user to disambiguate possible candidate hashtags. This may occur, for example, when the digital assistant finds multiple possible hashtags for different combinations of transcribed words, when there are two or more possible transcriptions, and/or when no popular hashtag is found and it is not obvious what words the user intended to be included in the hashtag. For example, the digital assistant may ask the user "Did you mean: #Favorite; #FavoriteIceCream; or #FavoriteIceCreamIsSoBoring?" The user may then select the intended hashtag, via voice or touch input, for example.

Once the digital assistant determines the best candidate hashtag, or once the user selects the intended hashtag, the formatted message may be displayed in the preview bubble 514, including the properly formatted hashtag "#FavoriteIceCream."

Figure 5C:
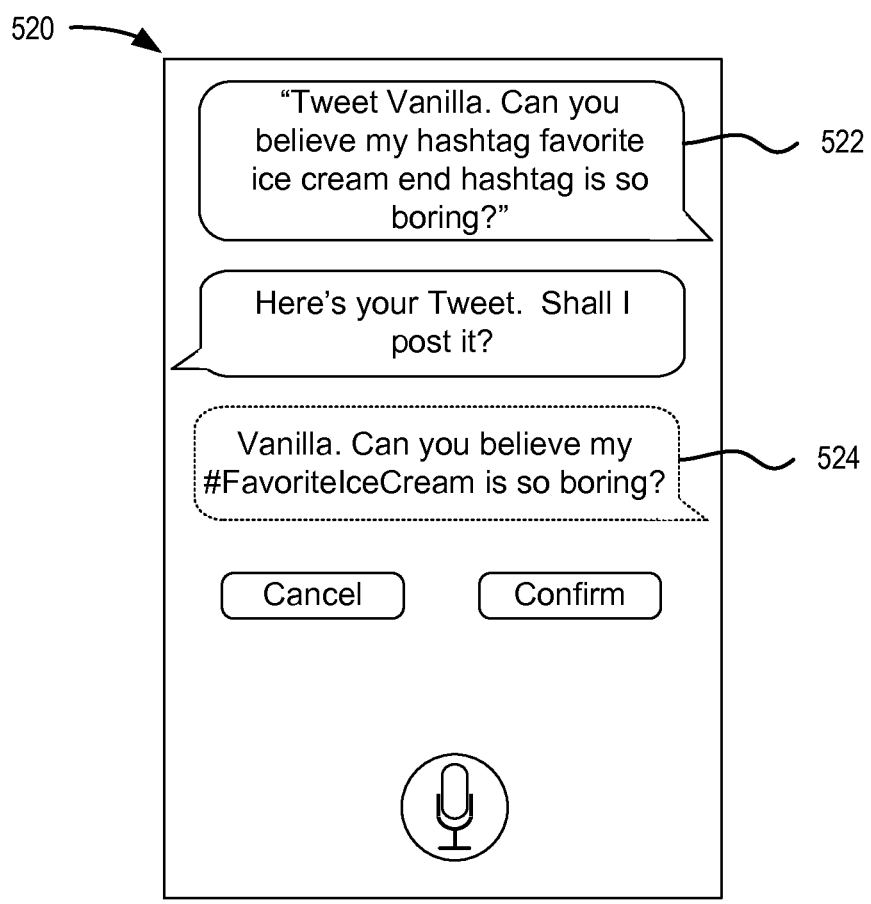

In some embodiments, keywords can also be used to signal the end of an intended hashtag. Specifically, the digital assistant may recognize a first keyword indicating the beginning of a hashtag (e.g., the word "hashtag"), and a second keyword to indicate the end of a hashtag (e.g., "hashtag" or "end hashtag"). Other keywords may also be used instead of or in addition to these, such as "hash start" and "hash end," or simply "hash" and "hash." FIG. 5C illustrates an example of a user interface 520 showing a dialogue between a user and a digital assistant where the user indicated both the beginning and the end of a hashtag with keywords, in accordance with some embodiments. In this example, the digital assistant 326 (e.g., using the speech to text processing module 330) transcribed an utterance from a user including the words "Tweet Vanilla. Can you believe my hashtag favorite ice cream end hashtag is so boring?" In some embodiments, this transcription is provided in bubble 522. The digital assistant 326 recognizes the keywords "hashtag" and "end hashtag," and creates a properly formatted hashtag using the words, numbers, and/or characters therebetween. As shown in preview bubble 524, the hashtag "#FavoriteIceCream" has been inserted into the message by the digital assistant 326 in response to recognizing the two keywords.

Figure 6:
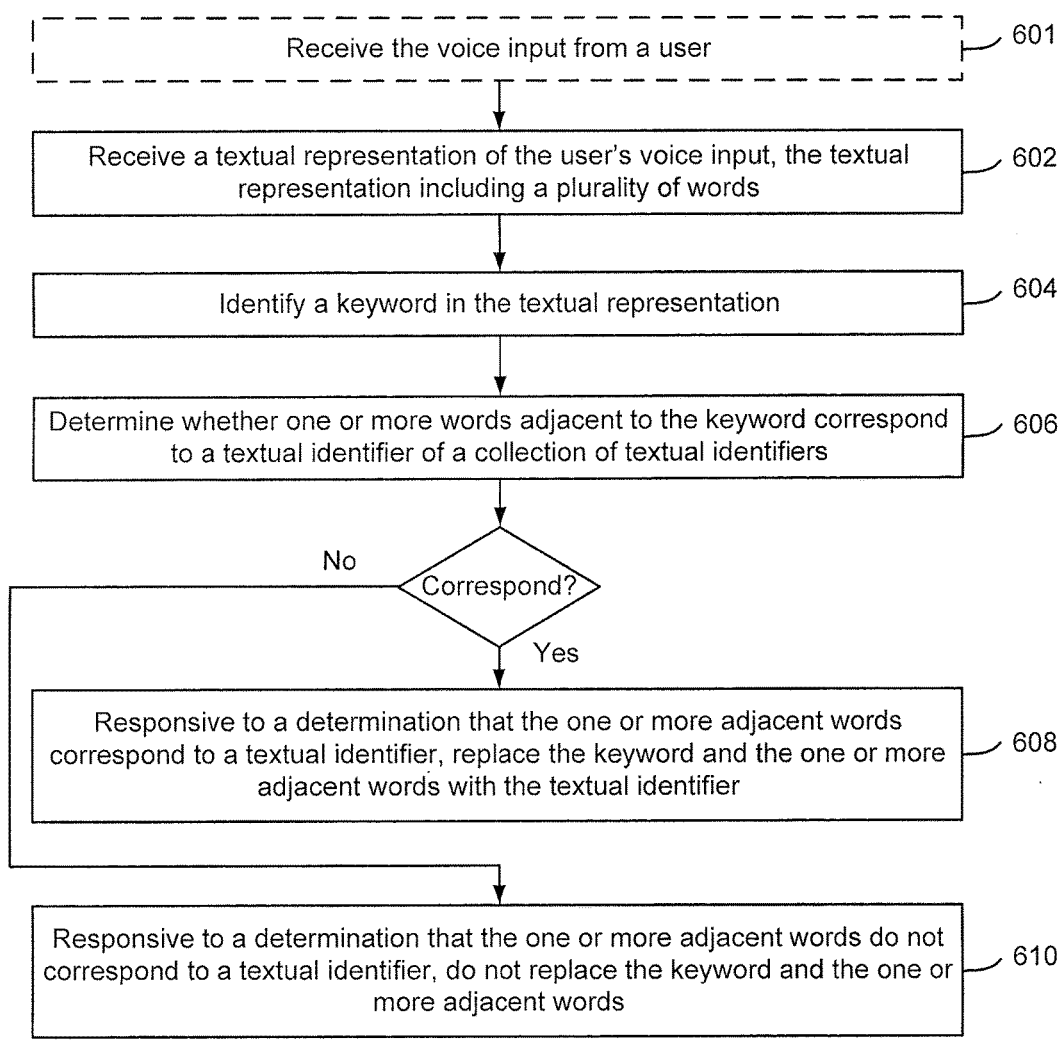
FIGS. 6-7 are flow charts illustrating methods of recognizing textual identifiers within a plurality of words in accordance with some embodiments.

FIG. 6 is a flow diagram illustrating a method 600 of recognizing textual identifiers within a plurality of words, in accordance with some embodiments. Textual identifiers are a type of special text that may be included in a body of text, and typically identify a particular person, theme, idea, comment, trend, etc. Textual identifiers include, for example, usernames (e.g., TWITTER usernames), tags (e.g., TWITTER hashtags), email addresses, and the like. In some embodiments, the method 600 is performed by the digital assistant system 300. In some embodiments, the method 600 is performed by the natural language processing module 332 of the digital assistant system 300.

In some embodiments, a voice input is received (601) from a user. The digital assistant receives (602) a textual representation of the user's voice input, the textual representation including a plurality of words. In some embodiments, the textual representation is generated by the speech-to-text processing module 330. In some embodiments, the textual representation is a file or data structure containing text that represents of one or more words, characters, etc. In some embodiments, the voice input is received via a microphone (e.g., microphone 230) of the user device 104. In some embodiments, the voice input is received at the same device that receives the textual representation (e.g., the user device 104).

The digital assistant identifies (604) a keyword in the textual representation. In some embodiments, the keyword is used to indicate that one or more of the following or adjacent words comprise a textual identifier. Any word(s) may be chosen as a keyword (including characters, numbers, letters, etc.), and the present method may recognize multiple types of textual identifiers, each identified by one or more keywords. In some embodiments, the keyword signaling a username is "at." In some embodiments, the keyword signaling a hashtag is "hashtag." In some embodiments, the keyword for a textual identifier corresponds to a symbol that signifies the textual identifier (e.g., "@" for a username, "#" for a hashtag).

In some embodiments, certain keywords are recognized only in the appropriate context. For example, if a user is composing a typical text message or email, the digital assistant may not attempt to identify usernames or hashtags, for example, by detecting keywords. In some embodiments, different keywords are used to trigger different behaviors in different contexts. For example, when composing a TWITTER message, the method may recognize the keywords "at" and/or "hashtag." When composing a different type of message or posting, however, the method may recognize the keywords "nickname" and/or "topic."

The digital assistant determines (606) whether one or more words adjacent to the keyword correspond to a textual identifier of a collection of textual identifiers. In some embodiments, the one or more adjacent words precede the keyword. In some embodiments, the one or more adjacent words follow the keyword. In some embodiments, the one or more adjacent words include words following and words preceding the keyword.

In some embodiments, the collection of textual identifiers is a set of usernames in a contact list associated with a user. In some embodiments, the collection is a set of usernames previously input by the user. In some embodiments, the collection is a set of usernames associated with a social networking account of the user. In some embodiments, the collection includes some or all usernames that are registered in a social network. In some embodiments, the collection includes hashtags that were previously input by the user. In some embodiments, the collection includes hashtags that were previously identified by a social network. In some embodiments, the collection includes hashtags that meet a predefined popularity metric. An example of a popularity metric in accordance with some embodiments is a frequency of appearance of the hashtag in a social network within a predefined time period.

Responsive to a determination that the one or more adjacent words correspond to a textual identifier, the digital assistant replaces (608) the keyword and the one or more adjacent words with the textual identifier. In some embodiments, at least one of the one or more adjacent words are composed only of a single letter. In some embodiments, the textual identifier is a concatenation of the one or more adjacent words without interstitial spaces. In some embodiments, the textual identifier is a concatenation of a symbol and the one or more adjacent words without interstitial spaces. In some embodiments, the symbol is "@." In some embodiments, the symbol is "#."

In some cases, a user may wish to include a keyword (e.g., "at," "hashtag," "tag," etc.) in a message, but does not want the word to identify a textual identifier. Accordingly, in some embodiments, responsive to determining that the one or more adjacent words do not correspond to a textual identifier, the digital assistant will not replace (610) the keyword with the word.

Figure 7:
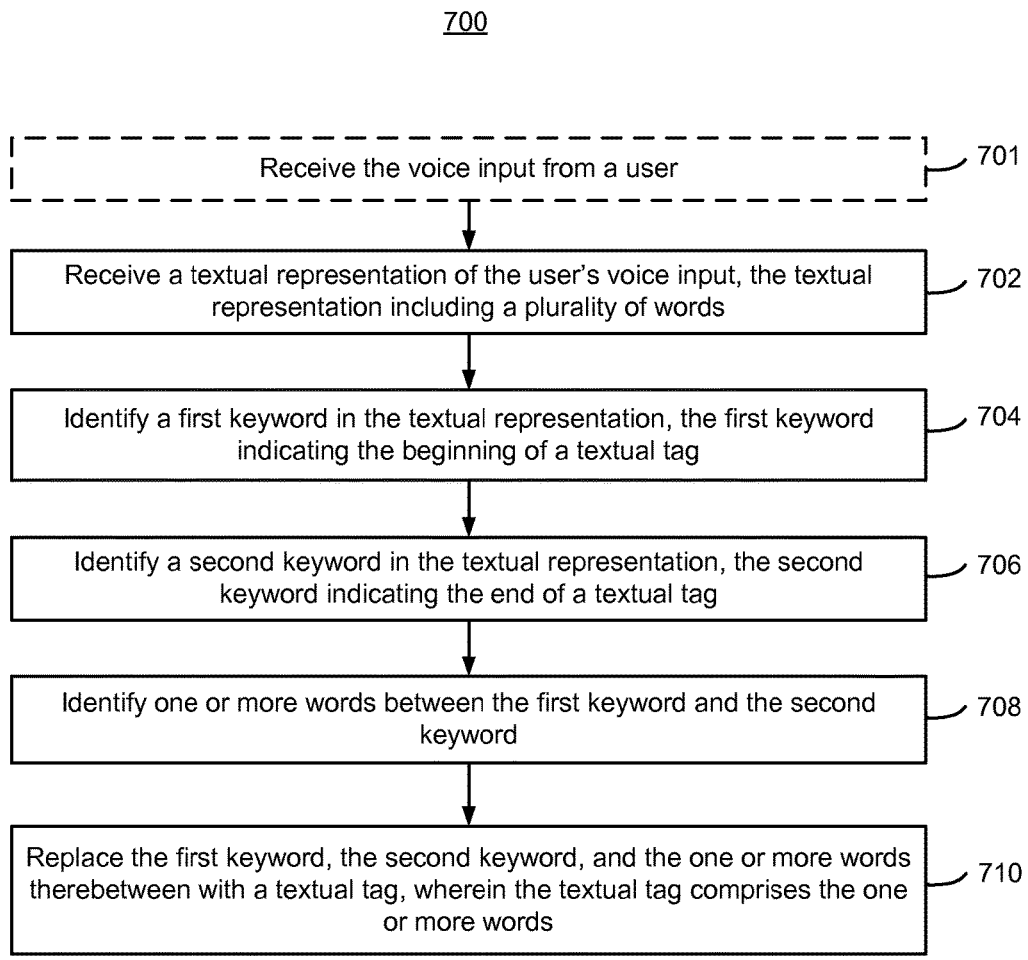

FIG. 7 is a flow diagram illustrating a method 700 of recognizing textual identifiers within a plurality of words, in accordance with some embodiments. In some embodiments, the method 700 is performed by the natural language processing module 332 of the digital assistant system 300.

In some embodiments, a voice input is received (701) from a user. The digital assistant receives (702) a textual representation of the user's voice input, the textual representation including a plurality of words. In some embodiments, the textual representation is generated by the speech-to-text processing module 330. In some embodiments, the textual representation is a file or data structure containing text that represents of one or more words, characters, etc. In some embodiments, the voice input is received via a microphone (e.g., microphone 230) of a user device 104. In some embodiments, the voice input is received at the same device that receives the textual representation (e.g., the user device 104).

The digital assistant identifies (704) a first keyword in the textual representation, the first keyword indicating the beginning of a textual tag. In some embodiments, the first keyword is "hashtag," though any other suitable keyword could be used, such as "at," "begin tag," "tag," etc.

The digital assistant identifies (706) a second keyword in the textual representation, the second keyword indicating the end of a textual tag. In some embodiments, the second keyword is "end hashtag," though any other suitable keyword could be used, such as "hashtag," "end tag," "end at," etc.

The digital assistant identifies (708) one or more words between the first keyword and the second keyword. The digital assistant then replaces (710) the first keyword, the second keyword, and the one or more words therebetween with a textual tag, wherein the textual tag comprises the one or more words. In some embodiments, the textual tag is a hashtag. In some embodiments, the textual tag comprises a symbol (such as "#") preceding the one or more words.

The foregoing description, for purpose of explanation, has been described with reference to specific embodiments. However, the illustrative discussions above are not intended to be exhaustive or to limit the disclosed embodiments to the precise forms disclosed. Many modifications and variations are possible in view of the above teachings. The embodiments were chosen and described in order to best explain the principles and practical applications of the disclosed ideas, to thereby enable others skilled in the art to best utilize them with various modifications as are suited to the particular use contemplated.

What is claimed is:

1. A method of recognizing textual identifiers within a plurality of words, comprising:

at an electronic device, which comprises a digital assistant, having one or more processors and memory storing one or more programs that when executed by the one or more processors cause the electronic device to perform the method:

receiving voice input from a user and processing the voice input using natural language processing to produce a textual representation, the textual representation including a plurality of words;

identifying, from the textual representation, an actionable intent from among a plurality of actionable intents recognizable by the electronic device, the actionable intent corresponding to tasks that can be performed by the electronic device;

identifying a keyword in the textual representation;

determining whether one or more words adjacent to the keyword correspond to a textual identifier of a collection of textual identifiers; and wherein, responsive to the identified actionable intent and a determination that the one or more adjacent words correspond to a properly formatted textual identifier, the digital assistant replaces the keyword and the one or more adjacent words with the textual identifier, wherein the textual identifier is a known hashtag or a username, wherein, if the textual identifier is a known hashtag, the collection includes hashtags that were previously identified by a social network, wherein, if the textual identifier is a username, the collection is a set of usernames that are registered in the social network.

2. The method of claim 1, wherein the textual identifier is a known hashtag.

3. The method of claim 2, wherein the known hashtag includes the symbol "#" followed by one or more words.

4. The method of claim 2, wherein the collection includes hashtags that meet a predefined popularity metric.

5. The method of claim 4, wherein the predefined popularity metric is a frequency of appearance in the social network within a predefined time period.

6. The method of claim 1, wherein the textual identifier is a username.

7. The method of claim 6, wherein the keyword corresponds to the symbol "@" and the word "at".

8. The method of claim 1, wherein the collection is a contact list of the user.

9. The method of claim 1, wherein the collection is a set of usernames previously input by the user.

10. The method of claim 1, wherein the adjacent words immediately follow the keyword.

11. The method of claim 1, wherein the textual identifier is a concatenation of the one or more adjacent words without interstitial spaces.

12. The method of claim 1, wherein the textual identifier is a concatenation of a symbol and the one or more adjacent words without interstitial spaces.

13. The method of claim 1, further comprising:
displaying the textual representation on a display of the electronic device.

14. The method of claim 13, wherein replacing the keyword and the one or more adjacent words with the textual identifier comprises replacing the keyword and the one or more adjacent words with the textual identifier on the display of the electronic device.

15. An electronic device, comprising:
one or more processors;
memory; and
one or more programs, wherein the one or more programs are stored in the memory and configured to be executed by the one or more processors, the one or more programs including instructions for:
receiving voice input from a user and processing the voice input using natural language processing to produce a textual representation, the textual representation including a plurality of words;
identifying, from the textual representation, an actionable intent from among a plurality of actionable intents recognizable by the electronic device, the actionable intents corresponding to tasks that can be performed by the electronic device;
identifying a keyword in the textual representation;
determining whether one or more words adjacent to the keyword correspond to a textual identifier of a collection of textual identifiers; and
wherein, responsive to the identified actionable intent and a determination that the one or more adjacent words correspond to a properly formatted textual identifier, the digital assistant replaces the keyword and the one or more adjacent words with the textual identifier, wherein the textual identifier is a known hashtag or a username, wherein, if the textual identifier is a known hashtag, the collection includes hashtags that were previously identified by a social network, wherein if the textual identifier is a username the collection is a set of usernames that are registered in the social network.

16. The electronic device of claim 15, wherein the textual identifier is a known hashtag.

17. The electronic device of claim 16, wherein the known hashtag includes the symbol "#"followed by one or more words.

18. The electronic device of claim 15, wherein the textual identifier is a concatenation of the one or more adjacent words without interstitial spaces.

19. The electronic device of claim 15, wherein the textual identifier is a concatenation of a symbol and the one or more adjacent words without interstitial spaces.

20. The electronic device of claim 15, wherein the one or more programs further include instructions for: displaying the textual representation on a display of the electronic device.

21. The electronic device of claim 20, wherein replacing the keyword and the one or more adjacent words with the textual identifier comprises replacing the keyword and the one or more adjacent words with the textual identifier on the display of the electronic device.

22. A non-transitory computer readable storage medium storing one or more programs, the one or more programs including instructions, which when executed by an electronic device, cause the device to:
receive voice input from a user and processing the voice input using natural language processing to produce a textual representation the textual representation including a plurality of words;
identify, from the textual representation, an actionable intent from among a plurality of actionable intents recognizable by the electronic device, the actionable intent corresponding to tasks that can be performed by the electronic device;
identify a keyword in the textual representation;
determine whether one or more words adjacent to the keyword correspond to a textual identifier of a collection of textual identifiers; and
wherein, responsive to the identified actionable intent and a determination that the one or more adjacent words correspond to a properly formatted textual identifier, replaeeth_e digital assistant replaces the keyword and the one or more adjacent words with the textual identifier, wherein the textual identifier is a known hashtag or a username, wherein, if the textual identifier is a known hashtag, the collection includes hashtags that were previously identified by a social network, wherein if the textual identifier is a username the collection is a set of usernames that are registered in the social network.

23. The non-transitory computer readable medium of claim 22, wherein the textual identifier is a known hashtag.

24. The non-transitory computer readable medium of claim 23, wherein the known hashtag includes the symbol"#" followed by one or more words.

25. The non-transitory computer readable storage medium of claim 22, wherein the textual identifier is a concatenation of the one or more adjacent words without interstitial spaces.

26. The non-transitory computer readable storage medium of claim 22, wherein the textual identifier is a concatenation of a symbol and the one or more adjacent words without interstitial spaces.

27. The non-transitory computer readable storage medium of claim 22, wherein the one or more programs further include instructions, which when executed by the electronic device, cause the device to:
 display the textual representation on a display of the electronic device.

28. The non-transitory computer readable storage medium of claim 27, wherein replacing the keyword and the one or more adjacent words with the textual identifier comprises replacing the keyword and the one or more adjacent words with the textual identifier on the display of the electronic device.

29. A method comprising:
 at an electronic device, which comprises a digital assistant, having one or more processors, a display, and memory storing one or more programs that when executed by the one or more processors cause the electronic device to perform the method:
 receiving a voice input from a user and processing the voice input using natural language processing to produce first textual representation, the first textual representation including a plurality of words;
 displaying the first textual representation on the display;
 identifying, from the textual representation, an actionable intent from among a plurality of actionable intents recognizable by the electronic device, the actionable intent corresponding to tasks that can be performed by the electronic device;
 identifying a keyword in the first textual representation;
 determining whether one or more words adjacent to the keyword correspond to a textual identifier of a collection of textual identifiers,
 wherein, responsive to the identified actionable intent and a determination that the one or more adjacent words correspond to a properly formatted textual identifier, the digital assistant replaces the keyword and the one or more adjacent words with the textual identifier to provide a second textual representation; and
 displaying the second textual representation on the display,
 wherein the textual identifier is a known hashtag or a username,
 wherein, if the textual identifier is a known hashtag, the collection includes hashtags that were previously identified by a social network,
 wherein if the textual identifier is a username the collection is a set of usernames that are registered in the social network.

30. The method of claim 29, further comprising:
 providing the second textual representation to another electronic deVice in response to a user input.

* * * * *

UNITED STATES PATENT AND TRADEMARK OFFICE
CERTIFICATE OF CORRECTION

PATENT NO.        : 10,019,994 B2
APPLICATION NO.   : 13/913173
DATED             : July 10, 2018
INVENTOR(S)       : Daniel Keen Page 1 of 1

It is certified that error appears in the above-identified patent and that said Letters Patent is hereby corrected as shown below:

In the Claims

In Column 25, Claim 15, Line 65, delete "intents" and insert -- intent --, therefor.
In Column 26, Claim 15, Line 15, delete "wherein" and insert -- wherein, --, therefor.
In Column 26, Claim 15, Line 15, delete "username" and insert -- username, --, therefor.
In Column 26, Claim 17, Line 21, delete ""#"followed" and insert -- "#" followed --, therefor.
In Column 26, Claim 22, Line 44, delete "representation" and insert -- representation, --, therefor.
In Column 26, Claim 22, Line 58, delete "replaeeth_e" and insert -- the --, therefor.
In Column 26, Claim 22, Line 65, delete "wherein" and insert -- wherein, --, therefor.
In Column 26, Claim 22, Line 65, delete "username" and insert -- username, --, therefor.
In Column 27, Claim 24, Line 4-5, delete "symbol"#"" and insert -- symbol "#" --, therefor.
In Column 28, Claim 29, Line 1, before "first" insert -- a --.
In Column 28, Claim 29, Line 26, delete "wherein" and insert -- wherein, --, therefor.
In Column 28, Claim 29, Line 26, delete "username" and insert -- username, --, therefor.
In Column 28, Claim 30, Line 31, delete "deVice" and insert -- device --, therefor.

Signed and Sealed this
Twenty-first Day of August, 2018

Andrei Iancu
*Director of the United States Patent and Trademark Office*